(12) United States Patent
Zhang

(10) Patent No.: US 9,996,297 B2
(45) Date of Patent: Jun. 12, 2018

(54) HOT-COLD DATA SEPARATION METHOD IN FLASH TRANSLATION LAYER

(71) Applicant: SK hynix Inc., Gyeonggi-do (KR)

(72) Inventor: Fan Zhang, Fremont, CA (US)

(73) Assignee: SK Hynix Inc., Gyeonggi-do (KR)

( * ) Notice: Subject to any disclaimer, the term of this patent is extended or adjusted under 35 U.S.C. 154(b) by 85 days.

(21) Appl. No.: 14/942,726

(22) Filed: Nov. 16, 2015

(65) Prior Publication Data

US 2016/0139812 A1 May 19, 2016

Related U.S. Application Data

(60) Provisional application No. 62/079,697, filed on Nov. 14, 2014.

(51) Int. Cl.
*G06F 3/06* (2006.01)
*G06F 12/02* (2006.01)

(52) U.S. Cl.
CPC ............ *G06F 3/064* (2013.01); *G06F 3/0608* (2013.01); *G06F 3/0616* (2013.01); *G06F 3/0647* (2013.01); *G06F 3/0679* (2013.01); *G06F 12/0246* (2013.01); *G06F 2212/1036* (2013.01); *G06F 2212/7205* (2013.01)

(58) Field of Classification Search
CPC ...... G06F 3/064; G06F 3/0608; G06F 3/0616; G06F 3/0647; G06F 3/0679; G06F 12/0246; G06F 2212/1036; G06F 2212/7205; G06F 2212/7211
USPC ........................................................ 711/103
See application file for complete search history.

(56) References Cited

U.S. PATENT DOCUMENTS

| 2007/0083697 | A1* | 4/2007 | Birrell | G06F 12/0246 711/103 |
| 2010/0157671 | A1 | 6/2010 | Mokhlesi | |
| 2011/0138148 | A1* | 6/2011 | Friedman | G06F 3/0613 711/173 |
| 2011/0264843 | A1* | 10/2011 | Haines | G06F 12/0246 711/103 |
| 2012/0023144 | A1* | 1/2012 | Rub | G06F 12/0246 707/813 |
| 2012/0102259 | A1* | 4/2012 | Goss | G11C 7/04 711/103 |
| 2013/0173854 | A1* | 7/2013 | Shim | G06F 12/0246 711/103 |

(Continued)

OTHER PUBLICATIONS

Chang, L., Chou, T., and Huang, L., "An Adaptive, Low-Cost Wear-Leveling Algorithm for Multichannel Solid-State Disks", Dec. 2013, ACM Transactions on Embedded Computing Systems (TECS), v.13, n.3, p. 1-26.*

(Continued)

*Primary Examiner* — Reginald G Bragdon
*Assistant Examiner* — Aaron D Ho
(74) *Attorney, Agent, or Firm* — IP & T Group LLP

(57) ABSTRACT

A method of data separation includes receiving a host write command operation, identifying temperature of data contained in memory blocks during the host write command operation, selecting a victim block of the memory blocks based on the identified temperature, moving data from the victim block to a destination block, and assigning a sequence number to the destination block when the destination block is full.

15 Claims, 4 Drawing Sheets

(56) References Cited

U.S. PATENT DOCUMENTS

2013/0173875 A1* 7/2013 Kim .................... G06F 12/0246
 711/160
2014/0207997 A1* 7/2014 Peterson ............. G06F 12/0246
 711/103
2014/0281188 A1 9/2014 Kwon

OTHER PUBLICATIONS

Y. Luo, Y. Cai, S. Ghose, J. Choi and O. Mutlu, "WARM: Improving NAND flash memory lifetime with write-hotness aware retention management," 2015 31st Symposium on Mass Storage Systems and Technologies (MSST), Santa Clara, CA, 2015, pp. 1-14. doi: 10.1109/MSST.2015.7208284.*

Desnoyers P., "Analytic modeling of SSD write performance", 2012, In Proceedings of the 5th Annual International Systems and Storage Conference (SYSTOR '12). ACM, New York, NY, USA, Article 12, 10 pages. DOI: https://doi.org/10.1145/2367589.2367603.*

K. Jang and T.H. Han, "Efficient garbage collection policy and block management method for NAND flash memory," 2010 2nd International Conference on Mechanical and Electronics Engineering, Kyoto, 2010, pp. V1-327-V1-331. doi: 10.1109/ICMEE.2010.5558538.*

* cited by examiner

US 9,996,297 B2

HOT-COLD DATA SEPARATION METHOD IN FLASH TRANSLATION LAYER

CROSS-REFERENCE TO RELATED APPLICATIONS

This application claims the benefit of U.S. Provisional Application No. 62/079,697 filed Nov. 14, 2014, the entire contents of which are incorporated herein by reference.

BACKGROUND

1. Field

Exemplary embodiments of the present disclosure relate to a memory system including a non-volatile storage medium, and more particularly, to a memory system including a memory device and a method for managing the memory device.

2. Description of the Related Art

Non-volatile storage mediums such as flash memory are increasingly gaining applications in both enterprise and consumer data storage solutions. The flash memories are resilient to shock and their input/output (I/O) performance is better than that of conventional hard disk drives. Also, in contrast to the conventional hard disk drives, the flash memories are small in size and consume little power. However, due to the limited storage space, an improvement of memory management is in need.

SUMMARY

Embodiments of the present disclosure are directed to a memory system including a memory device and a method for management of the memory device.

Aspects of the invention include a method of data separation. The method may include receiving a host write command operation, identifying temperature of data contained in memory blocks during the host write command operation, selecting a victim block of the memory blocks based on the identified temperature, moving data from the victim block to a destination block, and assigning a sequence number to the destination block when the destination block is full.

Further aspects of the invention include a system for data separation. The system may include a temperature determiner suitable for identifying temperature of data contained in memory blocks during a host write command, and a controller suitable for selecting a victim block of the memory blocks based on the identified temperature, moving data from the victim block to a destination block, and assigning a sequence number to the destination block when the destination block is full.

Additional aspects of the invention include a computer implemented process for data separation. The process may include program instructions to receive a host write command operation, identify temperature of data contained in memory blocks during the host write command operation, select a victim block of the memory blocks based on the identified temperature, move data from the victim block to a destination block, and assign a sequence number to the destination block when the destination block is full.

DETAILED DESCRIPTION

Figure 1:
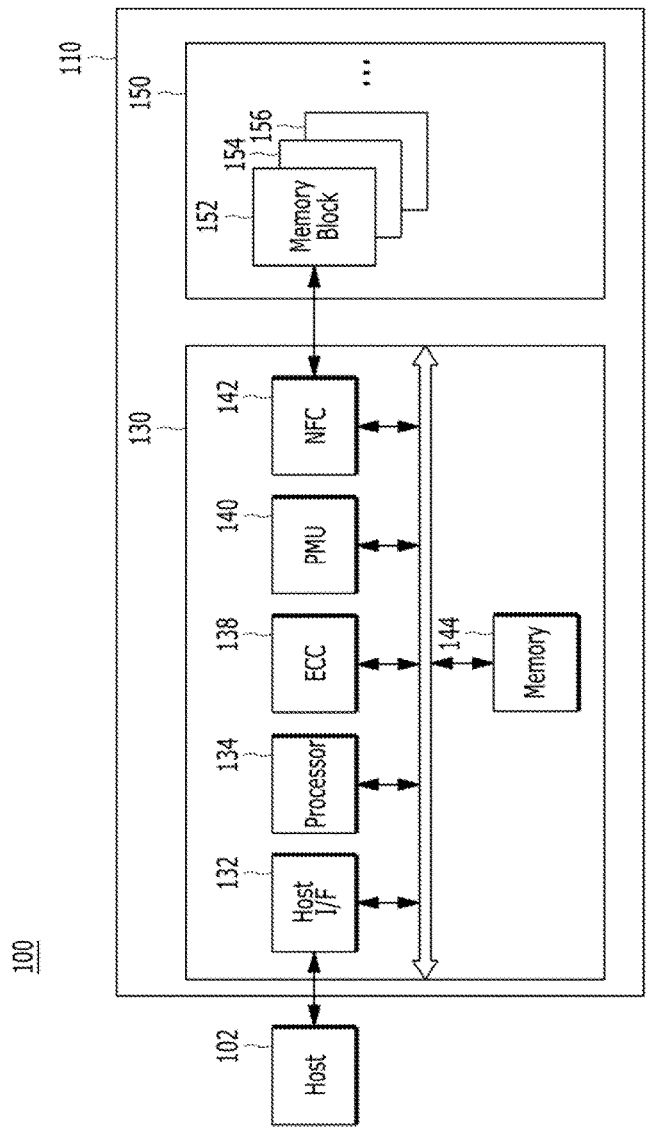
FIG. 1 is a diagram of a data processing system.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

FIG. 1 illustrates a data processing system 100. The data processing system 100 shown in FIG. 1 is for illustration only. Other constructions of the data processing system 100 could be used without departing from the scope of this disclosure. Although FIG. 1 illustrates one example of the data processing system 100, various changes may be made to FIG. 1. For example, the data processing system 100 may include any of elements, or may not include any of elements in any suitable arrangement.

Referring to FIG. 1, the data processing system 100 may include a host 102 and a memory system 110.

The host 102 may include, for example, a portable electronic device such as a mobile phone, an MP3 player and a laptop computer or an electronic device such as a desktop computer, a game player, a TV a projector, etc.

The memory system 110 may operate in response to a request from the host 102, and in particular, store data to be accessed by the host 102. In other words, the memory system 110 may be used as a main memory system or an auxiliary memory system of the host 102. The memory system 110 may be implemented with any one of various kinds of storage devices, according to the protocol of a host interface to be electrically coupled with the host 102. The memory system 110 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices for the memory system 110 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device and configure a memory card. The controller 130 and the memory device 150 may be integrated into one semiconductor device and configure a memory card such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a non-volatile memory device, for example, a flash memory. The flash memory may have a three-dimensional (3D) stack structure.

The controller 130 of the memory system 110 may control the memory device 150 in response to a request from the host 102. The controller 130 may provide the data read from the memory device 150 to the host 102, and store the data provided from the host 102 into the memory device 150. To this end, the controller 130 may control overall operations of the memory device 150, such as reads write, program, and erase operations.

In detail, the controller 130 may include a host interface unit 132, a processor 134, an error correction code (ECC) unit 138, a power management unit (PMU) 140, a memory controller (MC) 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E) serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The MC 142 may serve as a memory interface between the controller 130 and the memory device 150 to allow the controller 130 to control the memory device 150 in response to a request from the host 102. The MC 142 may generate control signals for the memory device 150 and process data under the control of the processor 134. When the memory device 150 is a flash memory such as a NAND flash memory, the MC 142 may generate control signals for the NAND flash memory 150 and process data under the control of the processor 134.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

As mentioned above, the memory device 150 may be a non-volatile memory such as a NAND flash memory. The flash memory is divided into many blocks and each block is divided into many pages. A page contains multiple addresses such as logic block addresses (LBAs), which are the smallest memory unit that can be accessed by the host device.

In NAND flash memory, in-place data updates are costly. To avoid this, updated data is written into a new physical location and the data at the old physical location is marked as invalid. To keep track of the mapping between an LBA and the valid physical location, a flash transition layer (FTL) table is maintained in the storage controller. As the results of out-of-place data updates, the physical space will run out eventually. To recycle the invalid physical pages, garbage collection (GC) is triggered occasionally.

When traffic data has hot and cold spots (e.g., subsets of LBA's having higher probabilities of occurrence than others), certain blocks will have higher program-erase (PE) counts than others. To ensure blocks wear out evenly, wear-leveling (WL) is triggered from time to time. As an important performance metric, write amplification (WA) is defined as the amount of data written to the NAND device divided by the amount of data written by the host. Different GC and WL policies determine the WA performance. When WA is lower, the performance is better. In general, for non-uniform traffic, there are two methods to reduce WA. The first method is to separate hot and cold data (e.g., WA can be reduced when data with similar temperatures are clustered into the same block). The second method is to delay the recycling of blocks with hot data because the hot data tend to invalidate themselves quickly such that delaying the GC on hot blocks will reduce the number of valid pages needed to be copied. Disclosed below is an FTL process which performed hot-cold data separation and delays GC on hot blocks with simple implementation that significantly reduces WA.

Figure 2:
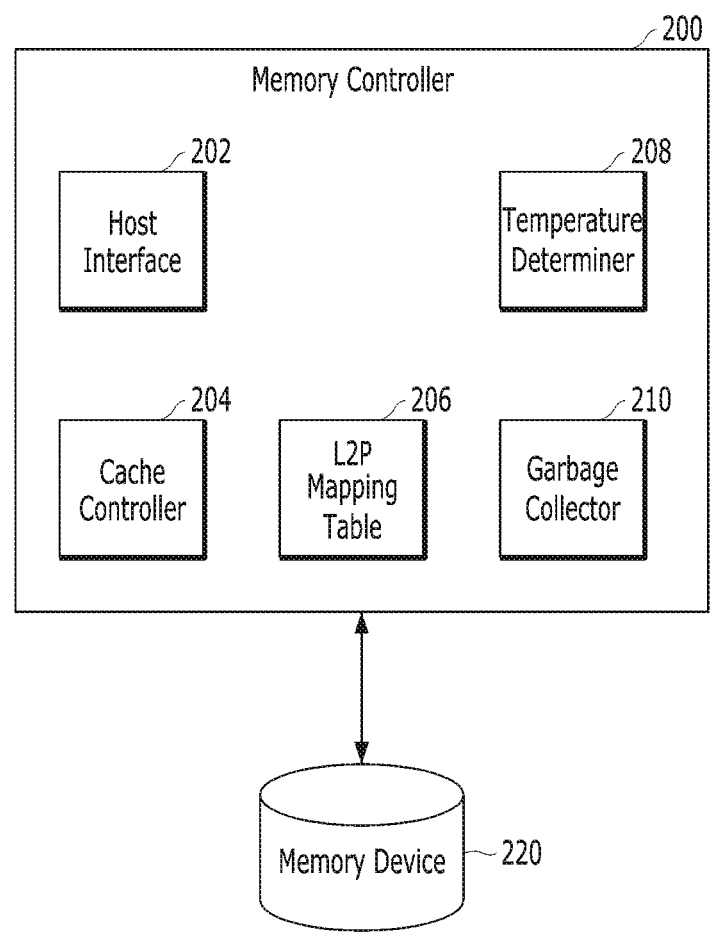
FIG. 2 is a block diagram of a memory system.

FIG. 2 is a block diagram of a memory system in accordance with embodiments of the present invention. The embodiment of the memory system shown in FIG. 2 is for illustration only. Other embodiments of the memory system could be used without departing from the scope of this disclosure.

Referring to FIG. 2, a memory system includes a memory controller 200 and a memory device 220. For example, the memory controller 200 and the memory device 220 correspond to the memory controller 142 and the memory device 150 shown in FIG. 1, respectively. In some embodiments, the memory controller 200 may be a semiconductor device, such as an application-specific integrated circuit (ASIC) or a field-programmable gate array (FPGA).

The memory device 220 may be a solid state storage, which is divided into a cache and a regular drive (not shown). The cache may be implemented using single-level cells (SLC) which store one bit per cell. The regular drive may be implemented using multi-level cells (MLC) which store two or more bits per cell. In some embodiments, the memory device 220 may be implemented a NAND flash memory.

The memory controller 200 includes a host interface 202, a cache controller 204, a logical to physical (L2P) mapping table 206, a temperature determiner 208, and a garbage collector 210.

The host interface 202 receives read instructions and write instructions from a host (e.g., the host 102 in FIG. 1). The cache controller 204 periodically determines the size of cache of the memory device 220. The L2P mapping table 206 is used to record the portion of the memory device 220 that belongs to the cache versus the regular drive. For example, the L2P mapping table 206 may include the range of addresses (e.g., physical) which are in the cache versus the regular drive.

The temperature determiner 208 determines a temperature for write data received from a host. Data is hot if it will be (or is at least believed to be) invalidated or otherwise overwritten shortly in the future. Data is cold if it will remain valid (i.e., will not be overwritten) for a time longer than hot data. The temperature determiner 208 may use any appropriated technique to determine the temperature of write data received from a host. Based on the temperature determined by the temperature determiner 208, hot data and cold data are stored in the different location of the memory device 220. For example, hot data may be stored in the cache of the memory device 220, and cold data is stored in the regular drive of the memory device 220. For another example, hot data may be stored in a first block of the memory device 220, and cold data is stored in a second block of the memory device 220.

The garbage collector 210 performs a garbage collection process. In order to reduce the WA, the garbage collector 210 may perform the garbage collection process in accordance with several schemes that use both the number of valid pages and their temperature to identify victim blocks.

Figure 3:
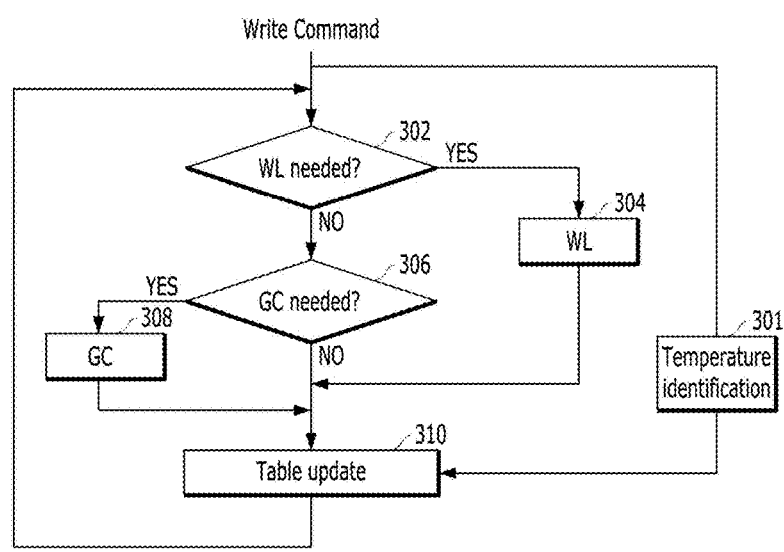
FIG. 3 is a flowchart of steps in a process for data separation.

FIG. 3 is a flowchart illustrating an embodiment of the process. At block 301, temperature of the data is identified. The data temperature may be identified as described below.

If an LBA was written ten (10) years ago, and has never been modified since, it may be a cold LBA. The longer an LBA has been resident in the storage device without modification, the higher the confidence that the LBA is, in fact, cold. LBAs, which are hot, may, by definition, be modified frequently and thus do not remain in the storage device for long periods of time without being modified. The fact may be used to, for example, determine the temperatures of valid data contained in each block in the device.

A sequence number may be maintained for blocks (e.g., each block) in a storage device. When a block is closed (e.g., the final LBA is written into the block), it may be assigned the current sequence number, which is then incremented for assignment to the next completed block in the device. This sequence number is generally used for recovery from unsolicited power interruption to correctly sequence the order in which the LBAs were written to the device. Such a sequencing scheme, however, may not be useful in some contexts. For example, if a GC operation takes two victim blocks with sequence numbers 1 and 2, and writes them into a GC destination block, which is the $1000^{th}$ block closed in the device, it may be assigned sequence number 1000. Based on this value, it may appear as though the data has been newly written when, in fact, the valid LBAs moved during the GC process have not been updated over the course of 999 blocks being closed. As such, a second sequence number (e.g., a MaxTimeStamp) may be added as information about each block. When a block is written with host data, the value of MaxTimeStamp is set to be equivalent to its sequence number when that block is closed. During the GC operation, however, the value of MaxTimeStamp of the GC destination blocks may be set to the maximum of the MaxTimeStamps of each of its GC victim blocks. In the example provided above, MaxTimeStamp would be set to two, which may indicate that no LBA in that block has been updated since the second block in the device was closed.

The difference of a block's MaxTimeStamp to the current sequence number in the device may be very well correlated with the temperature of the data contained within that block. For example, if a block has a value of MaxTimeStamp near the current sequence number, then it may be determined that at least a portion of the data contained in that block was recently written by the host. By definition, most data written by the host is hot data (e.g., since LBAs with the highest probability of being written by the host may turn up most frequently) and, therefore, this correlation holds. Conversely, if the disparity between the current sequence number and a give block's MaxTimeStamp is large, then the LBAs contained within that block may not have been updated by the host for a long period of time. As such, the data may necessarily be cold and, again, the correlation holds.

At block 302, it is determined whether wear leveling (WL) is needed. If needed, WL may be performed at block 304 as described herein.

Figure 4:
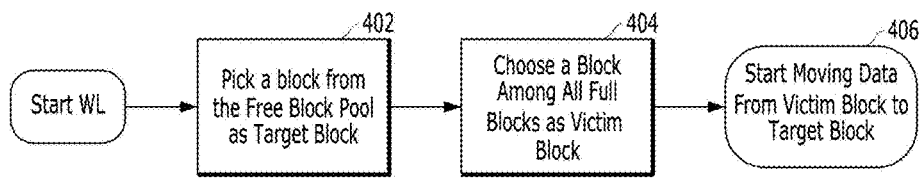
FIG. 4 is a flowchart of steps in a process for wear leveling.

Referring to FIG. 4, a flowchart of a WL process is shown. At block 402, a block from a free block pool is selected as the target block. At block 404, a block from the full blocks is selected as the victim block. In an embodiment, the block with the least number of P/E cycles is selected as the victim block. At block 406, the data is moved from the victim block to the target block.

Referring back to FIG. 3, at block 306, it is determined if garbage collection (GC) is needed. If needed, GC may be formed at block 308 as described below.

Figure 5:
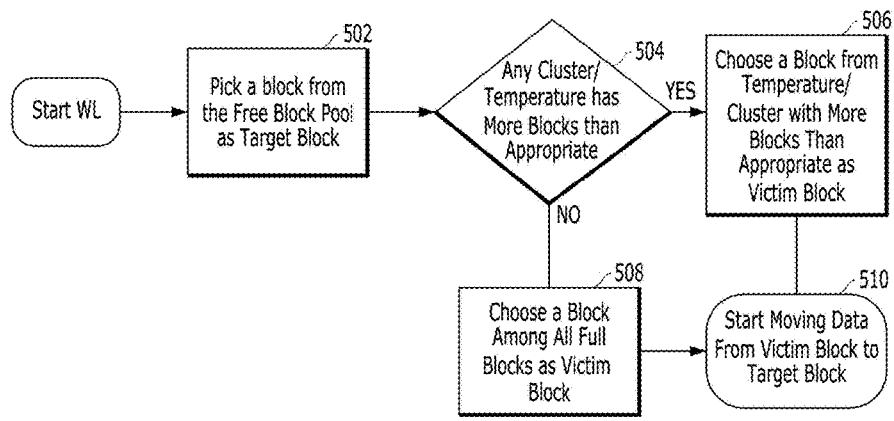
FIG. 5 is a flowchart of steps in a process for garbage collection.

FIG. 5 is a flowchart of a GC process according to embodiments of the invention. The garbage collection process may be triggered when an open host block of a temperature is full and a new block needs to be opened. Thus, at block 502, a block from the free block pool is selected as the target block. The selected block may be a block selected from a free block pool that has the least number of P/E cycles, or some other criterion.

At blocks 504, 506 and 508, a victim block is selected. At block 504, it is determined if all temperature clusters have the correct number of blocks at the start of the GC process. If all temperature clusters have the correct number, then at block 508, the block from the entire drive that has the least number of valid pages (or using some other criterion) is selected as the victim block. If the temperature has more blocks than assigned, then at block 506 the block with the temperature that has the least number of valid pages (or using some other criterion) is selected as the victim block. If multiple temperatures have more blocks than assigned, then a random temperature may be chosen, a temperature with the most number of blocks above the assigned number may be chosen, the temperature with the least value of mean LBA counts may be chosen, or some other criterion may be used. At block 510, data is moved from the victim block to the target block.

Referring back to FIG. 3, at block 310, the table update is performed. During the table update, the physical location of a particular LBA may be updated to the newly selected physical address.

Figure 6:
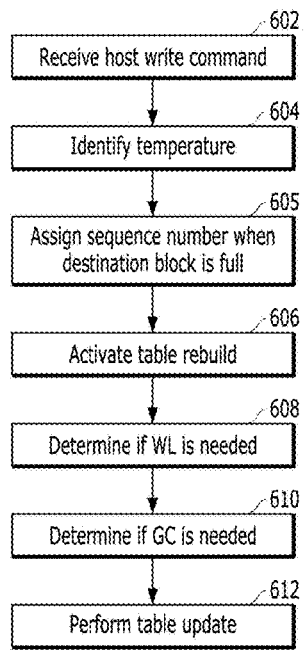
FIG. 6 is a flowchart of a method for data separation.

FIG. 6 is a flowchart of steps illustrating a process for reducing WA according to aspects of the invention. The method depicted in FIG. 6 may be performed as a host write data separation using one open block for the host write, therefore significantly reducing WA.

At block 602, a host write command is received. At block 604, data temperature is identified. The data temperature may be identified as described above. At block 606, a table rebuild is triggered. At block 608, it is determined whether WL is needed. If WL is needed, WL may be performed according to the process described above. At block 610 it is determined GC is needed. If GC is needed, GC may be performed according to the process described above. At block 612, the table update is performed.

Significant WA reduction is achieved and the processes and methods function as desired due to the following. When a table rebuild is triggered at power-up, the firmware will scan the meta-page of all full blocks. The meta-page contains the physical to logical mapping information. The firmware will read the meta-page from all full blocks according to the sequence numbers. The meta-page information from blocks with a smaller sequence number will be applied first. The sequence number is written to a block when a block is full. Thus, the sequence number serves as a time-stamp for the table rebuild because an LBA can have multiple instances at different blocks. Without the sequence number, there is no way to tell which copy is newer. In the disclosed technique, the sequence number might not be unique in all full blocks. For example, victim block A with sequence number x is chosen for GC. After copying half of the valid pages in A to GC block, GC block is full and assigned with sequence number x as described above. Now there are two blocks with sequence number x, one as the un-finished victim block, and the other one as the finished GC block. Both are full blocks, but this does not affect the table rebuild, because the process guarantees that the same LBA cannot exist in multiple blocks with the same sequence number. The data in all blacks with the same sequence number are from the valid page list of one single victim block. There will be no duplicated LBAs on the list. The process also guarantees that every valid LBA will not exist in all blocks with larger sequence numbers. That is, if LBA x is valid in block y, which has sequence number z, then there are no other copies of x, no matter valid or invalid, in any block with a sequence number larger than z.

Advantages to the technique described above include large WA reduction (25% WA reduction) and simplicity (the process does not require additional open blocks beyond a single open block).

While the present invention has been particularly shown and described with reference to exemplary embodiments thereof, it will be understood by those of ordinary skill in the art that various changes in form and details may be made therein without departing from the spirit and scope of the present invention as defined by the following claims. Thus, the foregoing is by way of example only and is not intended to be limiting. For example, any numbers of elements illustrated and described herein are by way of example only. The present invention is limited only as defined in the following claims and equivalents thereof.

What is claimed is:

1. A method of data separation, comprising:
    receiving a host write command operation;
    identifying temperature of data contained in memory blocks of a memory device during the host write command operation, clustering the memory blocks of similar identified temperature, and assigning a predetermined number of blocks for each temperature cluster;
    selecting a victim block based on at least the identified temperature from the temperature clusters, wherein
        when each number of blocks of every temperature cluster is less than or equal to the respective assigned predetermined number of blocks, the victim block is selected from all the memory blocks on the memory device, and
        when the number of blocks of any one of the temperature clusters is greater than the assigned predetermined number of blocks of the respective temperature cluster, the victim block is selected from memory blocks of the respective temperature cluster;
    moving data from the victim block to a destination block; and
    assigning a sequence number to the destination block when the destination block is full.

2. The method of claim 1, wherein the victim block is selected as the block with the least number of valid pages from the clustered memory blocks.

3. The method of claim 1, further comprising wear leveling during the host write command operation.

4. The method of claim 3, further comprising performing garbage collection after the wear leveling.

5. The method of claim 1, wherein the identifying step further includes determining temperature of data based on the distance between the assigned sequence number and a current sequence number.

6. A system for data separation, comprising:
    a temperature determiner suitable for identifying temperature of data contained in memory blocks during a host write command; and
    a controller suitable for:
        receiving a host write command operation;
        identifying temperature of data contained in memory blocks of a memory device during the host write command operation, clustering the memory blocks of similar identified temperature, and assigning a predetermined number of blocks for each temperature cluster;
        selecting a victim block based on at least the identified temperature from the temperature clusters, wherein
            when each number of blocks of every temperature cluster is less than or equal to the respective assigned predetermined number of blocks, the victim block is selected from all the memory blocks on the memory device, and
            when the number of blocks of any one of the temperature clusters is greater than the assigned predetermined number of blocks of the respective temperature cluster, the victim block is selected from memory blocks of the respective temperature cluster;
        moving data from the victim block to a destination block; and
        assigning a sequence number to the destination block when the destination block is full.

7. The system of claim 6, wherein the victim block is selected as the block with the least number of valid pages from the clustered memory blocks.

8. The system of claim 6, wherein the controller is further suitable for wearing level during the host write command operation.

9. The system of claim 8, wherein the controller is further suitable for performing garbage collection after the wear leveling.

10. The system of claim 6, wherein the temperature determiner is further suitable for determining temperature of data based on the distance between the assigned sequence number and a current sequence number.

11. A memory system comprising:
    a processor; and
    a non-transitory computer readable storage medium coupled to the processor, embedding computer program products executed by the processor, including computer instructions configured to:
    receive a host write command operation;
    identify temperature of data contained in memory blocks of a memory device during the host write command operation, cluster memory blocks of similar identified temperature, and assign a predetermined number of blocks for each temperature cluster;
    select a victim block based on at least the identified temperature from the temperature clusters, wherein
        when each number of blocks of every temperature cluster is less than or equal to the respective assigned predetermined number of blocks, the victim block is selected from all the memory blocks on the memory device, and
        when the number of blocks of any one of the temperature clusters is greater than the assigned predetermined number of blocks of the respective temperature cluster, the victim block is selected from memory blocks of the respective temperature cluster;
    move data from the victim block to a destination block; and
    assign a sequence number to the destination block when the destination block is full.

12. The memory system of claim 11, wherein the computer instructions are further configured to select the victim block as the block with the least number of valid pages from the clustered memory blocks.

13. The memory system of claim 11, wherein the computer instructions are further configured to
    wear level during the host write command operation.

14. The memory system of claim 11, wherein the computer instructions are further configured to determine temperature of data based on the distance between the assigned sequence number and a current sequence number.

15. The memory system of claim 11, wherein the computer instructions are further configured to
  perform garbage collection after the wear leveling.

* * * * *